(12) United States Patent  (10) Patent No.: US 8,701,869 B2
Robitaille et al.  (45) Date of Patent: Apr. 22, 2014

(54) APPARATUS HAVING MECHANICAL DRIVES FOR MOVING A DOLLY

(75) Inventors: Marc Robitaille, Quebec (CA); Stephane Desrosiers, Quebec (CA)

(73) Assignee: Supermetal Structures Inc., Saint-Romauld, Quebec (CA)

( * ) Notice: Subject to any disclaimer, the term of this patent is extended or adjusted under 35 U.S.C. 154(b) by 237 days.

(21) Appl. No.: 13/298,459

(22) Filed: Nov. 17, 2011

(65) Prior Publication Data

US 2013/0081927 A1  Apr. 4, 2013

Related U.S. Application Data

(60) Provisional application No. 61/541,202, filed on Sep. 30, 2011.

(51) Int. Cl.
*B65G 19/02* (2006.01)

(52) U.S. Cl.
USPC .......................................... 198/721; 198/812

(58) Field of Classification Search
CPC ................................ B65G 19/02; B65G 19/18
USPC ................................... 198/812, 721; 414/280
See application file for complete search history.

(56) References Cited

U.S. PATENT DOCUMENTS

| 3,788,452 | A | * | 1/1974 | McWilliams | 198/313 |
| 3,804,228 | A | * | 4/1974 | Felstehausen | 198/431 |
| 4,033,463 | A | * | 7/1977 | Cervin | 414/10 |
| 4,362,195 | A | * | 12/1982 | Hill | 144/250.12 |
| 4,425,069 | A | * | 1/1984 | Saur et al. | 414/398 |
| 5,791,715 | A | * | 8/1998 | Nebel | 296/26.13 |
| 7,108,125 | B2 | * | 9/2006 | Gilmore et al. | 198/812 |
| 7,395,918 | B2 | * | 7/2008 | Thompson | 198/812 |

FOREIGN PATENT DOCUMENTS

| GB | 2 179 318 | 3/1987 |
| JP | 57 107 331 | 7/1982 |
| JP | 2000 198 546 | 7/2000 |

OTHER PUBLICATIONS

JP 57 107 331—English language abstract.
JP 2000 198 546—English language abstract.

* cited by examiner

*Primary Examiner* — Ramya Burgess
*Assistant Examiner* — Thomas Randazzo
(74) *Attorney, Agent, or Firm* — BCF LLP

(57) ABSTRACT

The present disclosure relates to an apparatus for moving a dolly longitudinally along its base. The apparatus comprises a first motorized drive that transmits a drive from a motorized unit to a first rotating axle mounted on the apparatus. A second motorized drive transmits the drive from the first rotating axle to the dolly, thereby moving the dolly longitudinally along the base. The apparatus is environmentally friendly and may be operated in a wide range of temperatures, including in sub-freezing climates.

25 Claims, 12 Drawing Sheets

US 8,701,869 B2

APPARATUS HAVING MECHANICAL DRIVES FOR MOVING A DOLLY

TECHNICAL FIELD

The present disclosure relates to the field of freight transport. More specifically, the present disclosure relates to an apparatus having mechanical drives for moving a dolly.

BACKGROUND

The transport industry relies heavily on containers, such as so-called multi-modal containers that may be conveniently be transported in ships, on trains or pulled by tractor trailers. In the particular case of the trucking industry, flatbed trailers are commonly used for carrying loads, with or without containers.

Loading and unloading of trailers and containers may benefit from the use of heavy equipment but nevertheless remains a manpower-intensive operation. Billions of dollars worth of merchandize are shipped worldwide on a daily basis. Given such numbers, rapid loading and unloading of freight vehicles is an important economical requirement.

Within large, fixed manufacturing plants and storage plants, apparatuses for loading and unloading of containers or flatbed trailers are oftentimes permanently installed, for example having their foundations embedded in a concrete floor. It becomes fairly easy to ensure that such a floor is smooth, level and nearly horizontal. Motion of such apparatuses is generally provided by use of hydraulic systems. Hydraulic systems are economical and powerful. Use of hydraulic systems provides loading equipment flexibility in terms of adapting to all kinds of loads.

On temporary sites or on outdoor sites, loading equipment is subjected to additional constraints. These apparatus may need to be installed on uneven ground or on a modest slope. It may be required to change the location of loading equipment from time to time, according to constraints of a particular application. Hydraulic systems may not be able to withstand a wide variation of outdoor temperatures, between hot summer temperatures and sub-freezing winter climates. Additionally, the use of hydraulic systems may cause environmental concerns, as even a minor oil leak may cause stoppage of loading equipment and costly site decontamination.

Therefore, there is a need for improved loading and unloading techniques enabling rapid and economical freight manipulation, in various site and weather conditions, while ensuring proper care for the environment.

SUMMARY

According to the present disclosure, there is provided an apparatus for moving a dolly longitudinally along a base of the apparatus. A first mechanical drive transmits a drive from a motorized unit to a first rotating axle mounted on the apparatus. A second mechanical drive transmits the drive from the first rotating axle to the dolly.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Various aspects of the present disclosure generally address one or more of the problems of rapidly and economically loading and unloading containers and trailers, in various site and weather conditions. A disclosed apparatus for moving a dolly longitudinally along its base comprises a first mechanical drive capable of transmitting a drive from a motorized unit to a first rotating axle mounted on the apparatus. A second mechanical drive then transmits the drive from the first rotating axle to the dolly, enabling the dolly to move longitudinally in relation to the base. A dolly may be pushed from the apparatus onto a trailer or in a container. Likewise, a dolly may be pulled from a trailer or from a container, and brought onto the base of the apparatus.

The following terminology is used throughout the present disclosure:

Load: freight, cargo or goods.

Dolly: a platform for carrying heavy loads.

Base: a supporting part of a structure.

Roller chain: a chain for mounting on sprockets, for transmitting a force.

Drive: a propulsion effort.

Motorized unit: an ensemble generating a drive.

Mechanical drive: mechanical system for transmitting a drive.

Rotating axle: a shaft for transmitting a rotating movement to wheels, for example to sprockets.

Longitudinally: related to a lengthwise dimension.

Actuator: device for exerting a motion.

Proximal end: a part of an apparatus near a point of origin that is, in the present disclosure, near the motorized unit.

Distal end: a part of an apparatus distant from a point of origin.

Extension: device appended to another one.

Link: an attachment point for a chain, a cable or a rope.

Load balancing system: device for transmitting force between two or more points, whereby a load is distributed in a substantially even manner.

Traction plate: a plate for transmitting a drive.

Operably connected: directly or indirectly connected in a functional manner.

Pivot: a pin linking two elements while allowing rotation of one in function of the other.

Speed reducer: a device for transmitting motion from a rotating shaft to another shaft rotating at a lower speed.

Sprocket: a toothed wheel for driving a roller chain or for being driven by a roller chain.

Support: component supporting another.

Controller: electronic means for controlling an equipment.

Remote control: device connected to a controller via wired or wireless link for controlling an equipment.

Leg: a generally vertical support for a structure.

Leveling: bringing to a substantially horizontal position.

Power supply: equipment providing an electrical feed.

External power source: electrical supply external to the present apparatus.

Voltage converter: equipment for converting a voltage as received from a source to another voltage usage by the present apparatus.

Electric generator: electrical supply integral to the present apparatus.

Selector: control means for choosing one electrical source or another.

Figure 1:
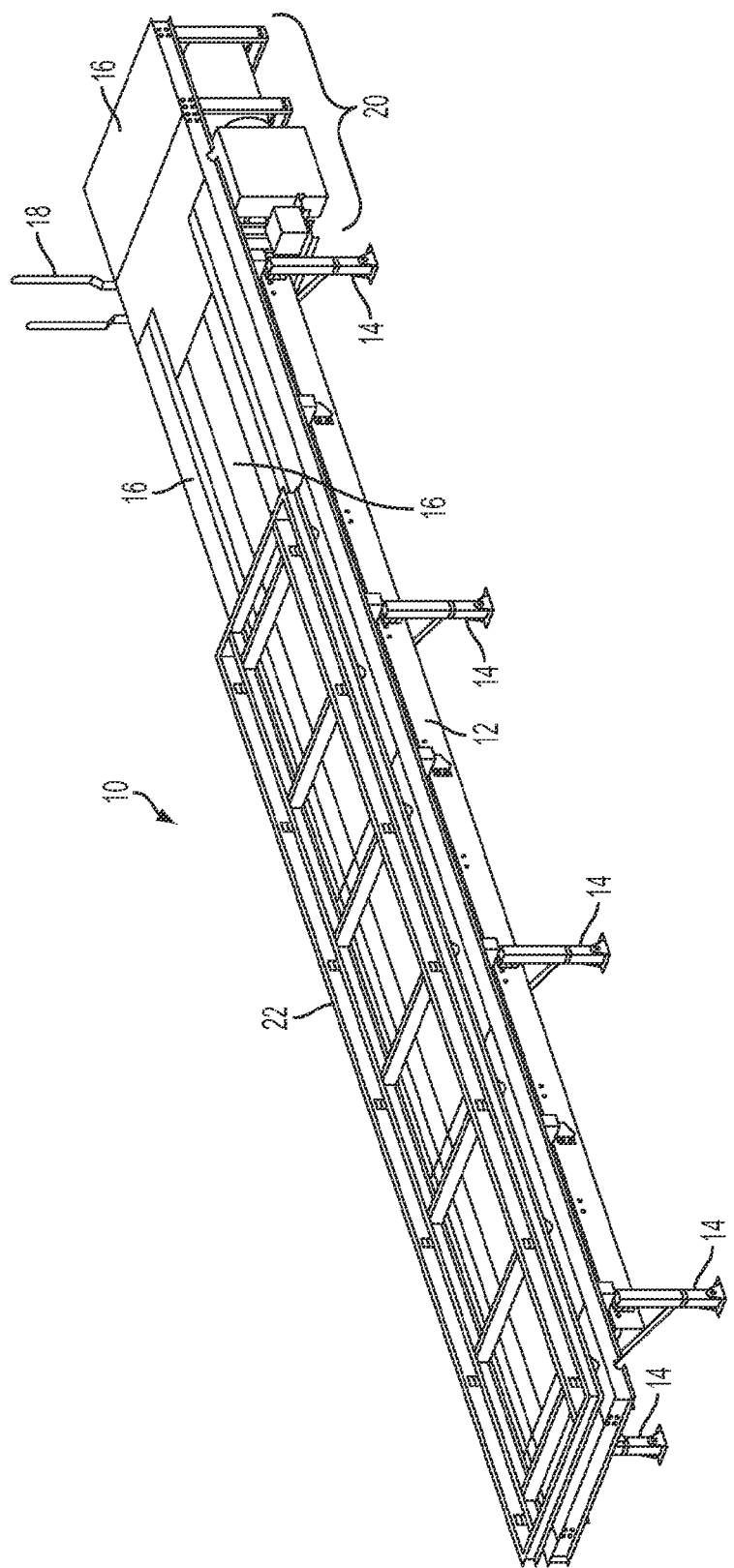
FIG. 1 is a perspective view of an example of apparatus supporting a dolly.

Referring now to the drawings, FIG. 1 is a perspective view of an example of apparatus supporting a dolly. An apparatus 10 may be used for loading and unloading dollies onto or from containers, flatbed trucks, and the like. The apparatus 10 as shown comprises a base 12, a plurality of adjustable legs 14, a plurality of supporting plates 16 having various formats and textures, a ladder 18 and various devices 20 for providing a drive to the apparatus 10. The devices 20, comprising a motorized unit, a controller and a power generation assembly, are shown in details in following Figures. A dolly 22 is mounted on the base 12 of the apparatus 10. The dolly 22 may be used for carrying heavy loads and may be pushed on or pulled from a container, a platform of a flatbed truck, and the like. Various elements of the apparatus 10 may be formed of steel, galvanized steel, aluminum, or other suitable materials and alloys, using beams and plates of sufficient gauge, with sufficient tensile and compression strength for a desired rated payload of the apparatus 10. The various beams, plates and other components may be screwed, bolted, riveted or welded together. Various materials may be used to construct the various elements of the apparatus 10. Those of ordinary skill in the art will be able to readily select the materials and assemble the components of the apparatus 10 for safe and reliable operation.

Figure 2:
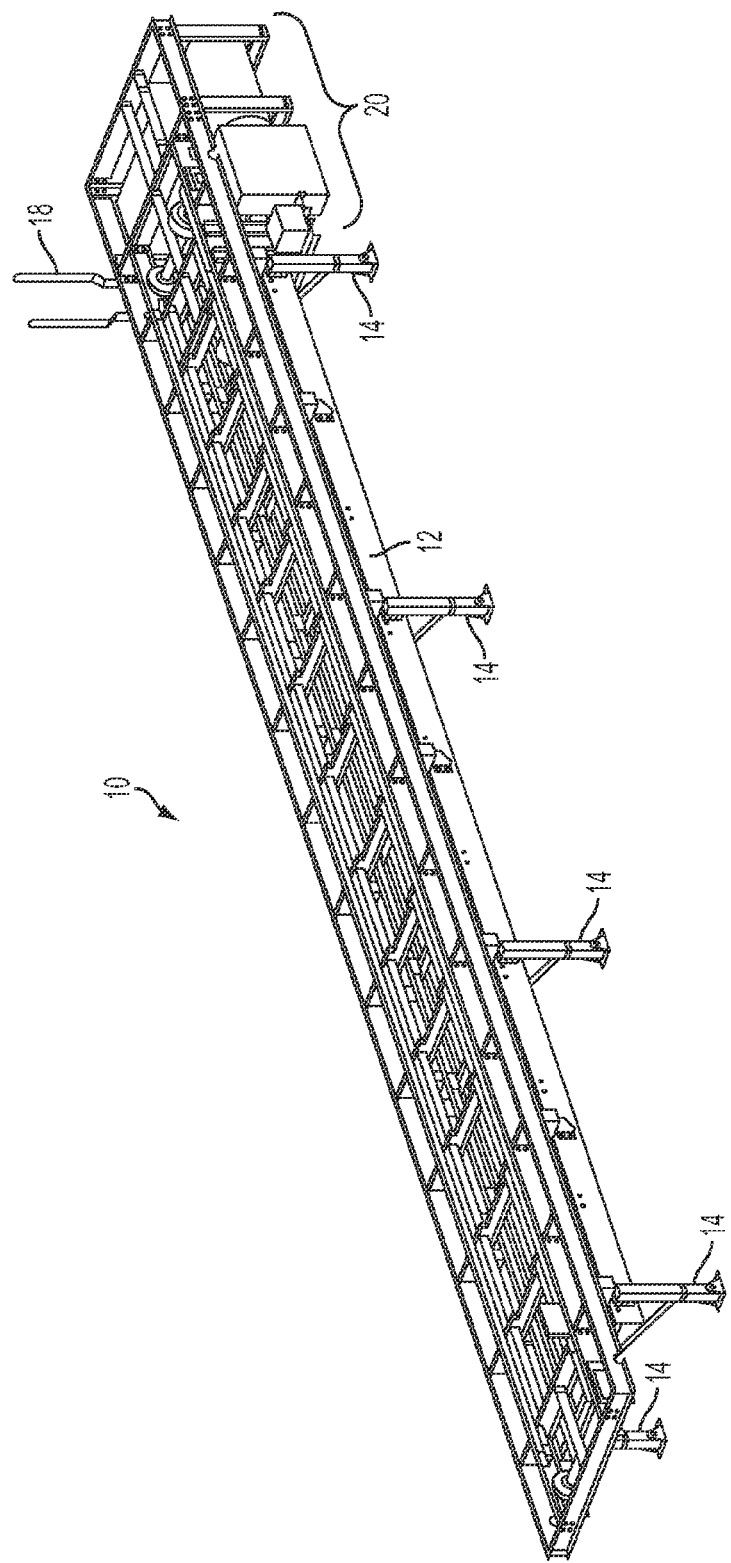
FIG. 2 is a perspective view of the apparatus of FIG. 1, without a dolly and with supporting plates removed.
Figure 3:
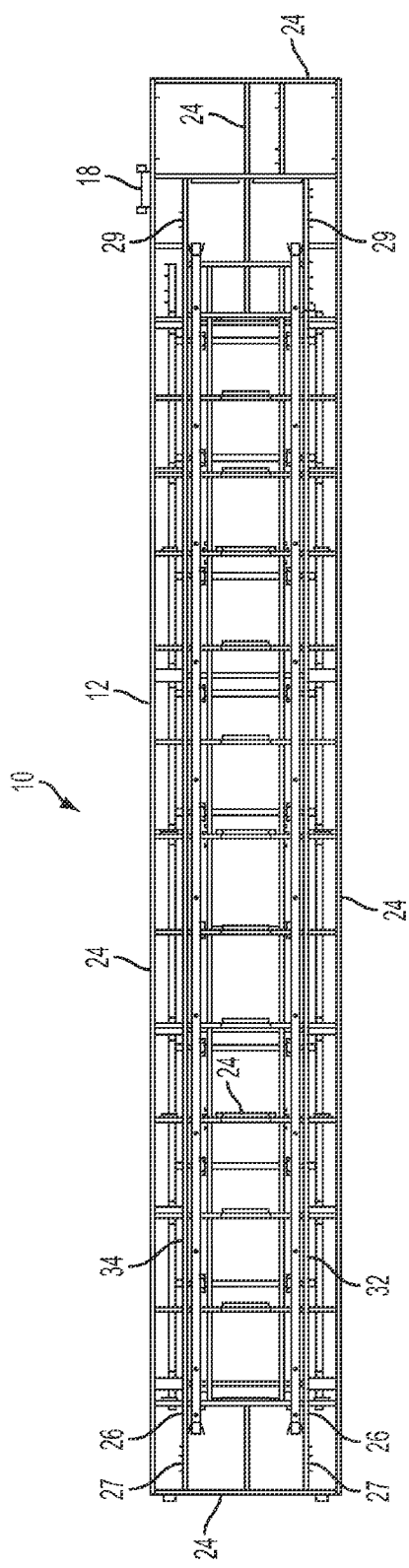
FIG. 3 is a top plan view of the apparatus of FIG. 1, without a dolly and with supporting plates removed.

FIG. 2 is a perspective view of the apparatus of FIG. 1, without a dolly and with supporting plates removed, showing details of the base 12. FIG. 3 is a top plan view of the apparatus of FIG. 1, without a dolly and with supporting plates removed. In the examples of FIGS. 1, 2 and 3, the base 12 is generally shaped as an elongated rectangular frame, having a number of longitudinal and transversal beams 24 sufficient to support the masses of the apparatus 10, of the dolly 22 and of a load carried by the dolly 22. The shape of the base 12 as shown is adapted to move dollies that are constructed for loading onto traditional containers. Of course, a different base could have a different shape depending on a shape of dollies intended for other applications. The shape of the base 12 as shown is therefore a non-limiting example. The base 12 rests on the adjustable legs 14 (shown in earlier Figures). Those of ordinary skill in the art will be able to construct the base 12 for supporting such masses, so the structure of the base 12 as shown is a non-limiting example. The base 12 further comprises two channels 26 running along much of the length of the base 12 for carrying roller chains (shown on later Figures). Areas 27 and 29 show connection points for rotating axles (shown on later Figures).

Figure 4:
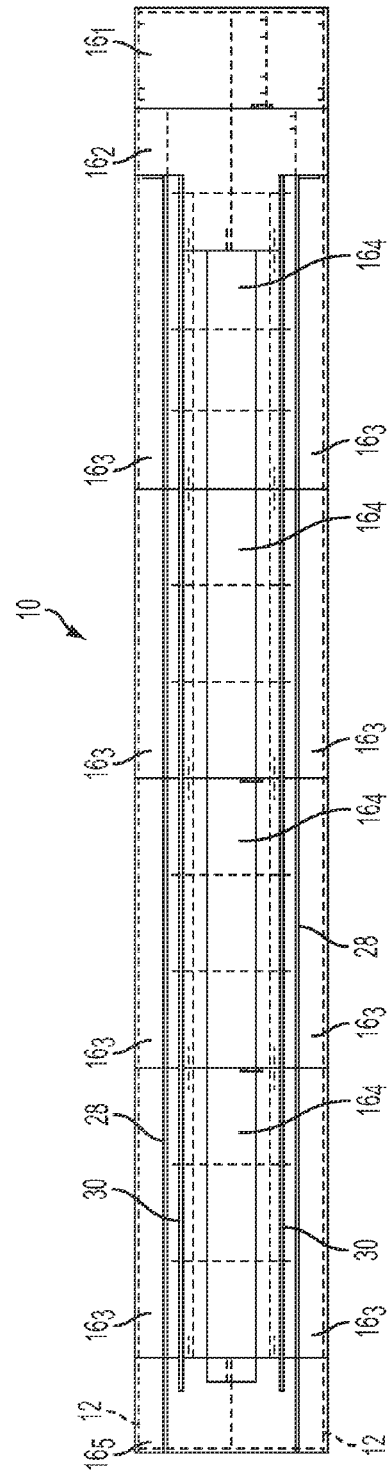
FIG. 4 is a top plan view of supporting plates of the apparatus of FIG. 1.

FIG. 4 is a top plan view of supporting plates of the apparatus of FIG. 1. Various supporting plates $16_1$-$16_5$ are mounted on the base 12 and provide a rolling surface for the dolly 22 while also providing a surface for workers desiring to climb on the apparatus 10 using the ladder 18. Of course, the configuration of the supporting plates $16_1$-$16_5$ is a non-limiting example. In an embodiment, some of the supporting plates $16_4$ may have a non-slip pattern in order to provide a safe walking surface for workers on the apparatus 10. Supporting plates $16_3$ form, on both sides of the base 12, rails 28 for guiding wheels (shown on a later Figure) of the dolly 22. Grooves 30 are formed by gaps between the supporting plates $16_3$ and $16_4$, the grooves 30 being located directly above the channels 26 of FIG. 3. The grooves 30 continue into supporting plates $16_2$ and $16_5$, at or near both extremities of the apparatus 10. Of course, the arrangement of the grooves and of the plates may be altered according to the needs of a particular realization.

Figure 5:
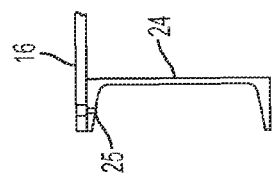
FIG. 5 is a detailed view showing an attachment point of a supporting plate on the apparatus of FIG. 1.

FIG. 5 is a detailed view showing an attachment point of a supporting plate on the apparatus of FIG. 1. A supporting plate 16 is mounted on the base 12 by attachment to a beam 24 of the base 12 using a bolt 25 or any other suitable attachment means, including for example a rivet of a welded point.

Figure 6:
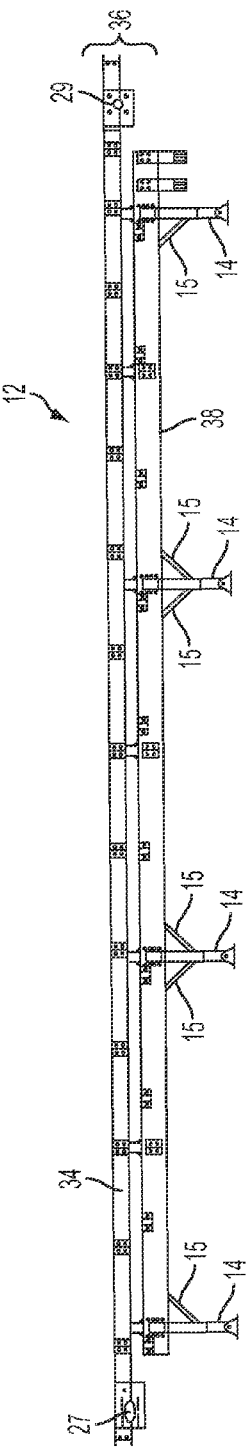
FIG. 6 is a first, side elevation cutaway view of a base for the apparatus of FIG. 1.
Figure 7:
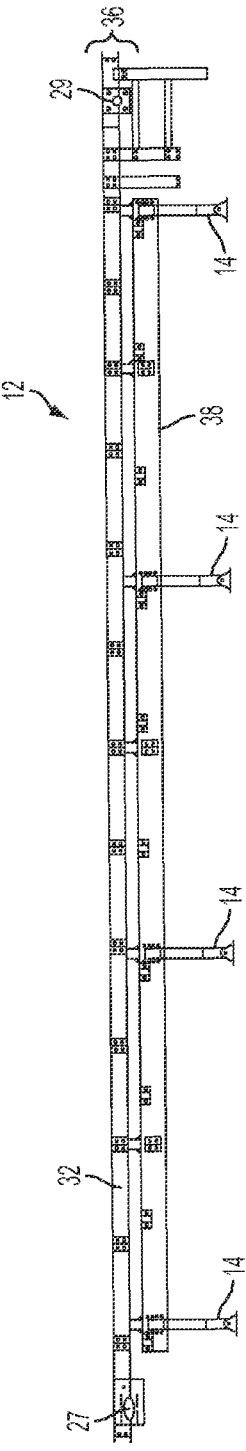
FIG. 7 is a second, side elevation cutaway view of a base for the apparatus of FIG. 1.

FIG. 6 is a first, side elevation cutaway view of a base for the apparatus of FIG. 1. Specifically, a beam 34 shown on FIG. 3 is also shown on FIG. 6, the beam 34 indicating where the cutaway view of FIG. 6 relates to FIG. 3. FIG. 6 shows optional diagonal braces 15 linking the adjustable legs 14 to the beam 34. Likewise, FIG. 7 is a second, side elevation cutaway view of a base for the apparatus of FIG. 1. A beam 32 is visible on both FIGS. 3 and 7, indicating a relationship between the views of these two Figures. As shown on the particular embodiment of FIGS. 6 and 7, the base 12 may comprise a top part 36 resting on a bottom part 38 on which the adjustable legs 14 are attached.

It may be observed that the cutaway views of FIGS. 6 and 7 do not show the complete extent of the length of the base 12; an extremity comprising the devices 20 providing the drive to the apparatus 10 are not present in those views.

Figure 9:
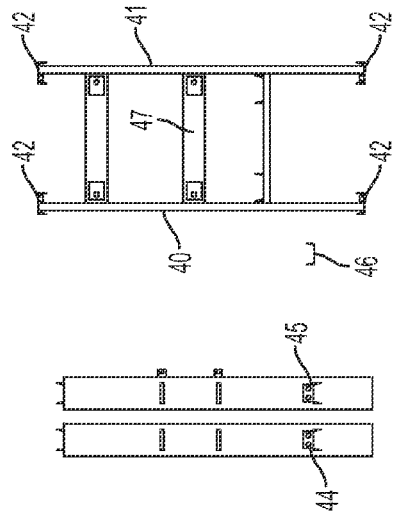
FIG. 9 is a top plan view of the extremity illustrated in FIG. 8.
Figure 8:
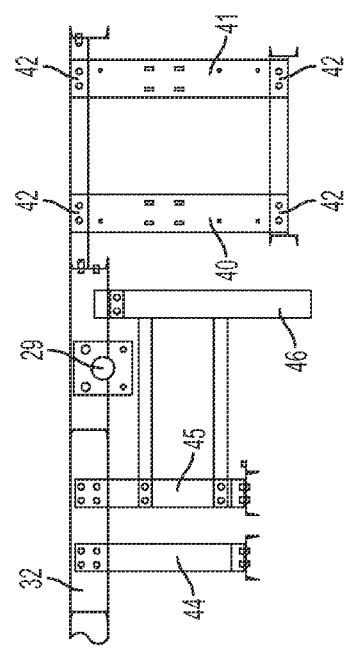
FIG. 8 is a detailed view of an extremity of the cutaway view of FIG. 7.
Figure 10:
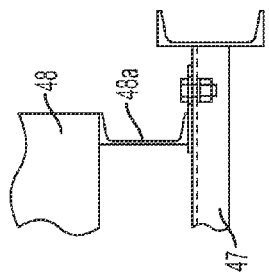
FIG. 10 is a further detailed view of the extremity illustrated in FIG. 8, showing a point of attachment of an electric generator.

FIG. 8 is a detailed view of an extremity of the cutaway view of FIG. 7. FIG. 9 is a top plan view of the extremity illustrated in FIG. 8. Braces 40, 41, 44 and 45, and beam extensions 42 and 46, not visible on FIG. 7, are added to the views of FIGS. 8 and 9. The braces 40, 41, 44 and 45 are for holding some of the devices 20. FIG. 10 is a further detailed view of the extremity illustrated in FIG. 8, showing a point of attachment of an electric generator. A partial cutaway view of an electric generator 48 shows a positional relationship between the electric generator 48, a brace 48a integral to a casing of the electric generator 48 and a beam 47.

Figure 11:
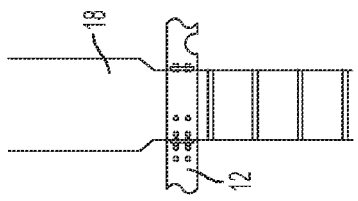
FIG. 11 is a detailed view of a ladder attached to the apparatus of FIG. 1.

FIG. 11 is a detailed view of a ladder attached to the apparatus of FIG. 1. The ladder 18 may simply be bolted on a side of the base 12. The ladder 18 may be omitted in some embodiments, and a precise location of the ladder 18 may be modified according to the needs of a particular installation.

Figure 13:
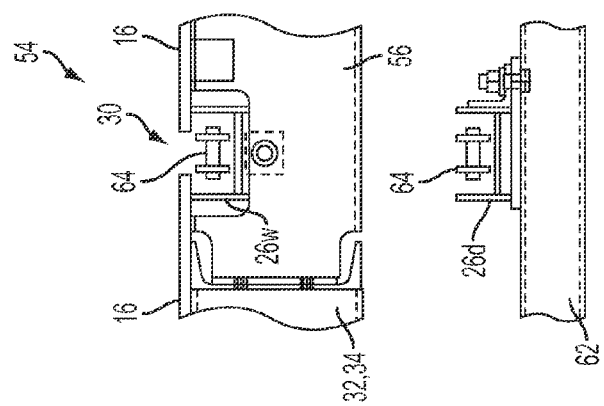
FIG. 13 is a detailed view of an aspect of FIG. 12, showing a channel for a roller chain.
Figure 12:
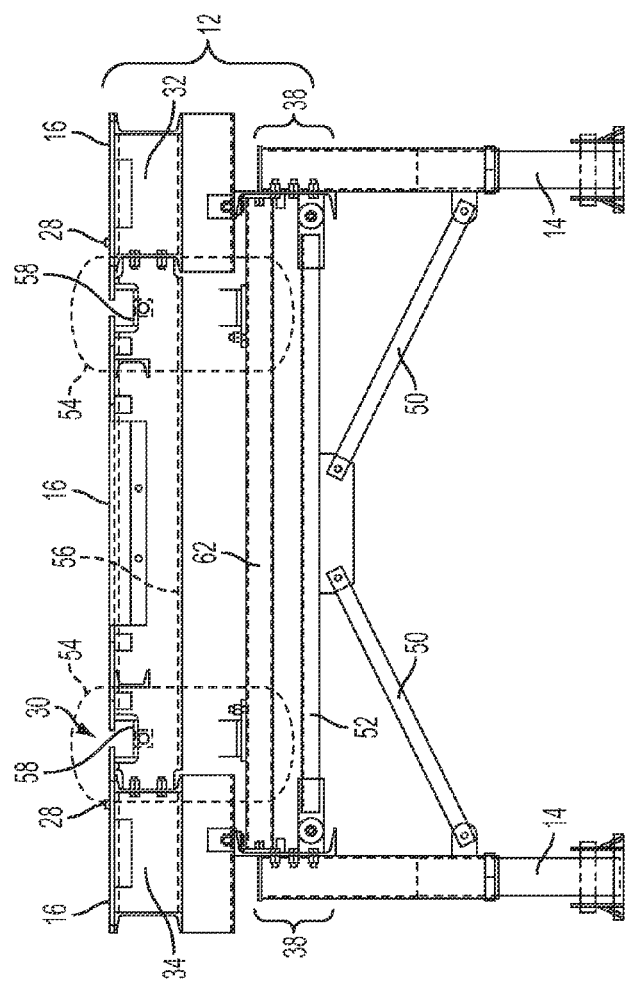
FIG. 12 is an elevation cutaway view of the apparatus of FIG. 1.

FIG. 12 is an elevation cutaway view of the apparatus of FIG. 1. The legs 14 are attached to the bottom part 38 at their top and are further supported by diagonal braces 50 connected to a horizontal beam 52 attached to both sides of the bottom part 38. Of course, the structure of the base 12 and the manner of attaching the legs 14 thereto is illustrative and non-limiting, as those of ordinary skill in the art will be able to design a suitable base having other formats. FIG. 12 also shows a location on the base 12 of the grooves 30 introduced in the above description of FIG. 4, the grooves 30 being placed above the channels 26. FIG. 13 is a detailed view of an aspect of FIG. 12, showing a channel for a roller chain. Areas 54 of FIG. 12 are further shown on FIG. 13, with the understanding that two such areas 54 are mirroring each other. The channels 26 introduced in the foregoing description of FIG. 3 comprise upper channels $26_u$, placed within recesses of transversal beams 56 connecting the beams 32 and 34, and lower channels $26_d$, fixed on top of transversal beams 62 attached underneath the beams 32 and 34. Safety guards (not shown) may be added to prevent an operator from accidentally touching the roller chains. Although not explicitly shown on FIGS. 12 and 13, the channels 26$_u$ and 26$_d$ extend along the length of the base 12, substantially with a same length as that of the grooves 30. Two (2) roller chains 64, one on each side of the base 12, form loops running along the length of the channels $26_u$ and $26_d$.

Returning to FIG. 12, the legs 14 may be individually adjustable for adjusting a height of the base. The base 12 may be leveled by extending or contracting the various legs 14. In some embodiments, the legs 14 may be electrically adjustable.

Figure 14:
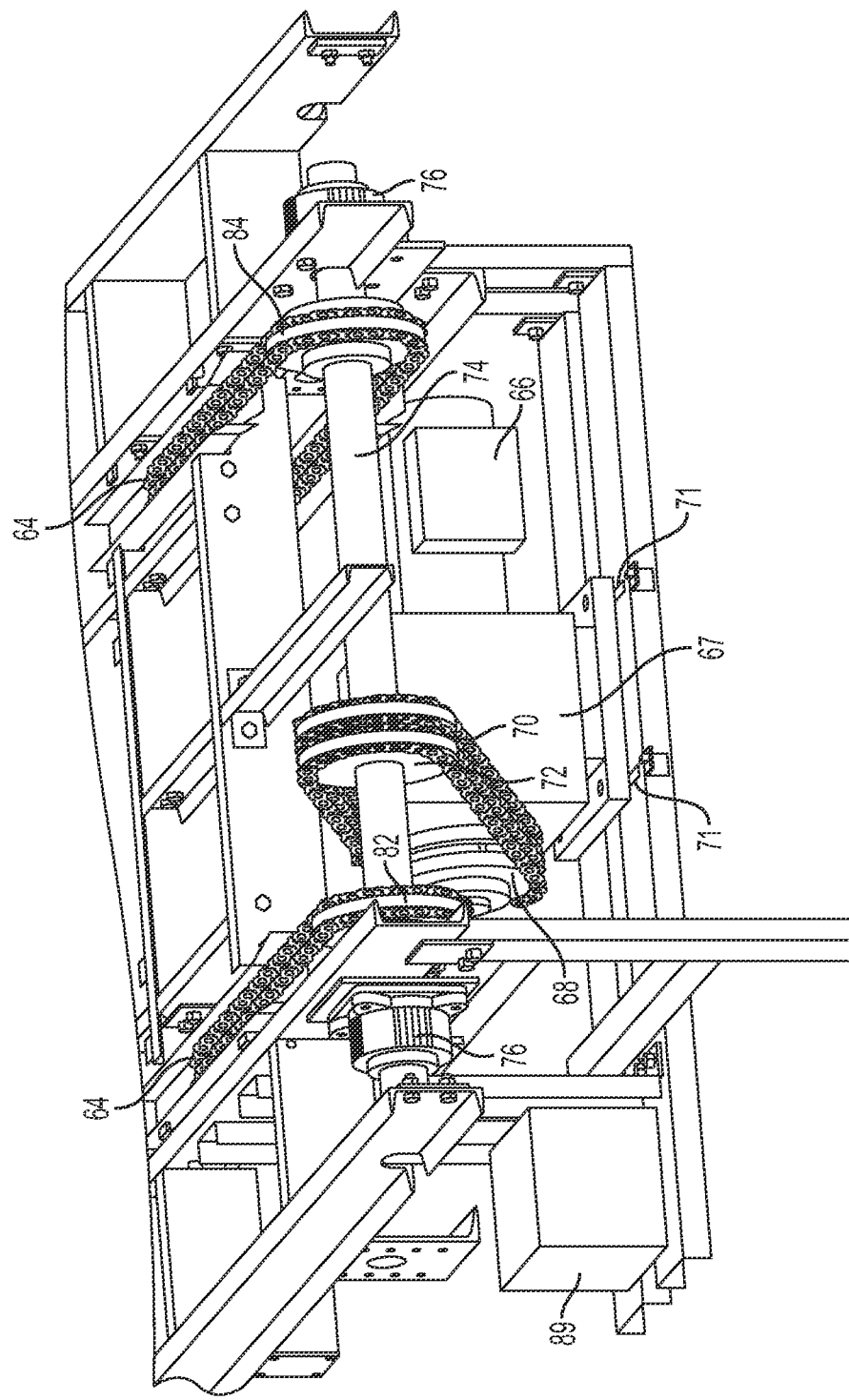
FIG. 14 is a perspective cutaway view of the apparatus of FIG. 1, showing details of a motorized unit and of two mechanical drives.

FIG. 14 is a perspective cutaway view of the apparatus of FIG. 1, showing details of a motorized unit and of two mechanical drives. A motorized unit may be located at a proximal end of the apparatus 10, within the area identified as 20 on FIG. 1. The motorized unit comprises an electric motor 66 having a shaft coupled to a sprocket 68. In an embodiment, the electric motor 66 may be coupled to the sprocket 68 via a speed reducer 67. The speed reducer 67 greatly increases a driving torque transferred to the sprocket 68 by the electric motor 66. The sprocket 68 drives a first mechanical drive which, in an embodiment, comprises a roller chain 70. In an embodiment, the speed reducer 67 may be mounted in the apparatus 10 on beams having slots 71 for moving the speed reducer 67, thereby adjusting a tension of the roller chain 70. The roller chain 70 transmits a drive from the electric motor 66 to a sprocket 72 mounted on a rotating axle 74. The rotating axle 74 is attached to the base 12 via flange bearings 76 mounted on the base 12 at areas 29, which may be at the proximal end of the apparatus 10. The drive of the electric motor 66 is further transmitted from the rotating axle 74 to a second mechanical drive which, in an embodiment, comprises the roller chains 64 and an actuator (described hereinbelow). Transmission of the drive to the roller chains 64 of the second mechanical drive is made via sprockets 82 and 84 mounted on the rotating axle 74.

In the specific embodiment of FIG. 14, the sprockets 68 and 72 and the roller chain 70 are doubled for added safety and reliability.

In an alternate embodiment, the sprockets 82 and 84 and the two roller chains 64 may be replaced by a single sprocket mounted centrally on the rotating axle 74 and by a single chain 64 placed substantially at mid-width of the base 12, a single groove 30 formed on the supporting plates 16 being centrally placed at mid-width of the base 12, above a central channel 26. However, for an apparatus 10 designed for 60,000-pound payloads, with an electric motor rated at 7.5 horsepower (HP) for example, use of a pair of roller chains 64 having, for example, a traction rating of 4.6 HP per chain may confer to the apparatus 10 an ample coefficient of safety.

Figure 15A:
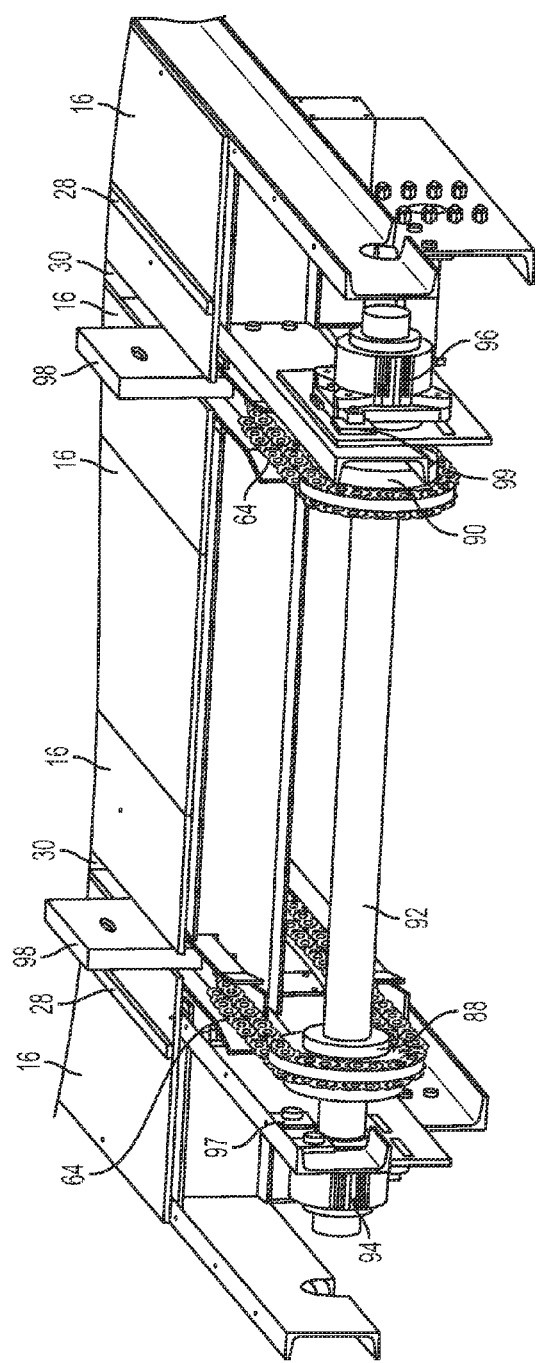
FIG. 15a is a perspective cutaway view of the apparatus of FIG. 1, showing details of an end of the apparatus opposite from the motorized unit of FIG. 14.

FIG. 15a is a perspective cutaway view of the apparatus of FIG. 1, showing details of an end of the apparatus opposite from the motorized unit of FIG. 14. The view of FIG. 15a is at a distal end of the apparatus 10. The roller chains 64 are shown at a distal end from the rotating axle 74 of FIG. 14. The roller chains 64 revolve around sprockets 88 and 90, which are mounted on a rotating axle 92. The rotating axle 92 attaches to the base 12 at areas 27 via flange bearings 94 and 96. The flange bearings 94 and 96 are attached to the apparatus 10 via adjustment systems 97 and 99 for adjusting a tension of each roller chains 64.

Figure 15B:
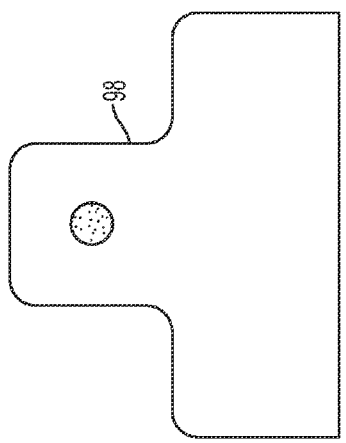
FIG. 15b shows details of an upright plate according to an embodiment.

The second mechanical drive also comprises sturdy upright plates 98, attached to each of the roller chains 64 and protruding through the grooves 30. A shape of the upright plates 98 may differ from that shown on FIG. 15a, as the Figure shows one of possible suitable shapes. FIG. 15b shows details of an upright plate according to an embodiment. As the roller chains 64 revolve around the sprockets 82, 84, 88 and 90, the upright plates 98 move forward or backward within the grooves 30. The drive originating from the motorized unit is transmitted via the chains 64 and via the upright plates 98 to an actuator, as expressed hereinbelow.

Figure 16:
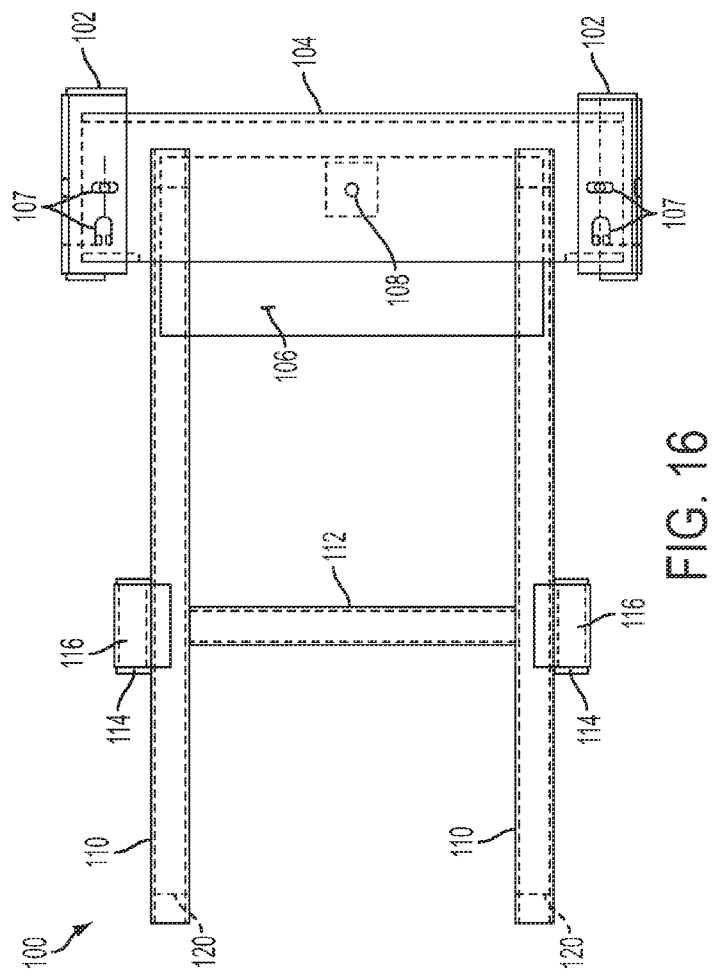
FIG. 16 is a top plan view of an actuator for transmitting motion from the apparatus of FIG. 1 to a dolly.

FIG. 16 is a top plan view of an actuator for transmitting motion from the apparatus of FIG. 1 to a dolly. The second mechanical drive further comprises an actuator 100 located at the distal end of the apparatus 10. The actuator 100 comprises end connectors 102 for attaching, for example using pins or bolts (not shown), to the upright plates 98 (not visible on FIG. 16), two forward beams 110, one transversal beam 112 and two rollers 114 for resting the actuator 100 on the supporting plates 16. Safety guards (not shown) may be added in order to prevent accidental contact with the rollers 114.

Figure 17:
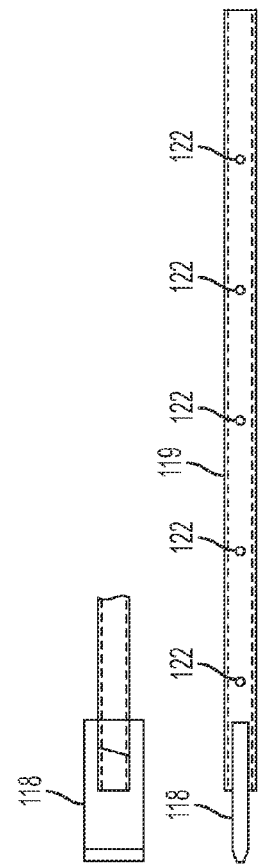
FIG. 17 is a detailed view of an extension of the actuator of FIG. 16.

FIG. 17 is a detailed view of an extension of the actuator of FIG. 16. Bumpers 118 affixed to extension 119 may be inserted at the end of each forward beam 110 for pushing on the dolly 22. It may be observed that when pushing the dolly 22, in case of a sudden stop of the motorized unit, the cables, ropes or chains attached to the dolly 22 and to the links 116 effectively prevent the dolly 22 from continuing its forward motion. Likewise, when pulling the dolly 22 via the chains, cables or ropes attached to the links 116, the bumpers 118 prevent the dolly 22 from continuing its rearward motion. Each of the forward beams 110 is traversed by a hole 120. A plurality of holes 122 traverses the extensions 119. A position of the extensions 119 on the forward beams 110 may be adjusted by aligning one of the holes 122 with the hole 120 and by inserting a pin or a bolt (not shown).

Figure 18:
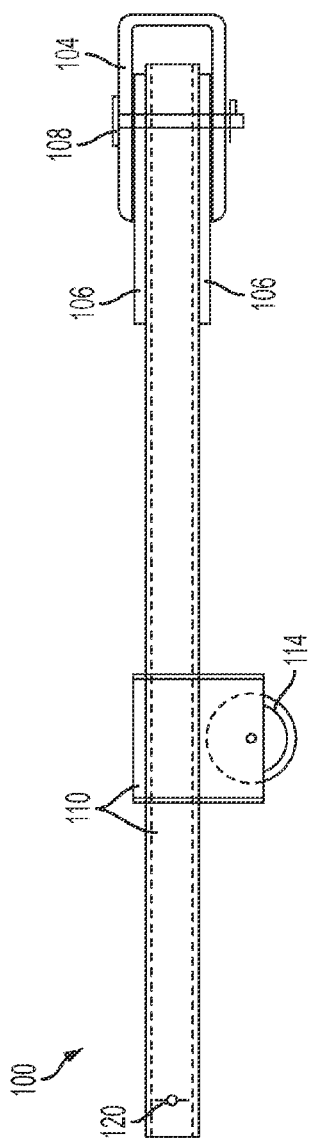
FIG. 18 is a side elevation view of the actuator of FIG. 16.

In some embodiments, the end connectors 102 may be directly attached in a solid manner to the forward beams 110, transferring the drive received from the upright plates 98 directly. However, in contrast with hydraulic systems in which oil pressure tends to balance any differential drive between two sides of a system, use of the roller chains 64 to transmit the drive over the length of the apparatus 10 may bring additional challenges. Despite care taken in ensuring lateral symmetry of the apparatus 10, a path of one of the roller chains 64 may slightly differ in length from the path of the other roller chain. Any slack in one of the roller chains 64 may cause it to carry a very small share of the total drive while the other roller chain 64 carries a much larger share of the total drive. Returning to FIG. 16, as shown, a transversal, U-shaped first traction member 104 is attached to the end connectors 102 via pins 107. A transversal plate is fixedly attached to the two forward beams and acts as a second traction member 106. A sturdy pin connects the first and second traction members 104, 106, substantially at their mid width. FIG. 18 is a side elevation view of the actuator of FIG. 16. In the embodiment of FIG. 18, the second traction member 106 is made of two plates placed above and below the forward beams 110 and fixedly attached thereto. The U-shaped first traction member 104 is connected to the upright plates 98 via the end connectors 102, receiving therefrom the drive from the motorized unit. The drive is transferred from the first traction member 104 to the second traction member 106 via a pin 108.

Figure 19:
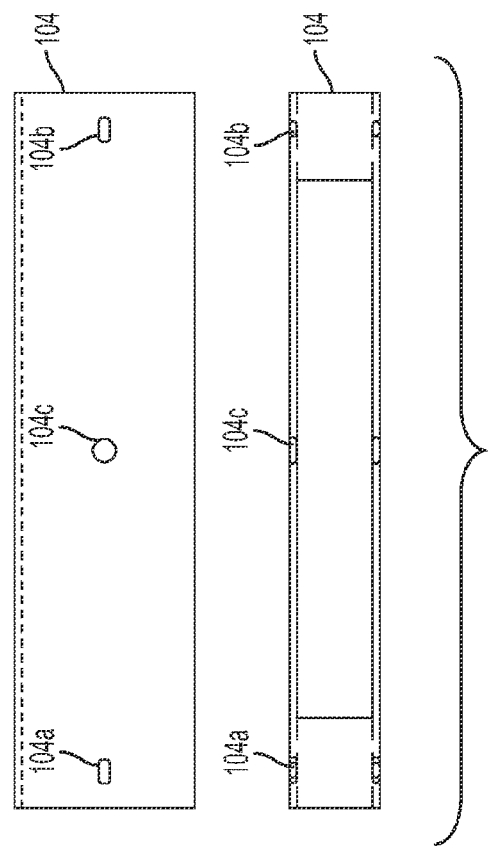
FIG. 19 is a detailed view of a traction member of the actuator of FIG. 16.

FIG. 19 is a detailed view of a traction member of the actuator of FIG. 16. The top of the Figure shows the first traction member 104 in top view while the bottom of the Figure shows the same member 104 in frontal elevation. Slots $104_a$ and $104_b$ allow a slidable connection of the first traction member 104 to the end connectors 102 via the pins 107 while central hole $104_c$ allows connection of the first traction member 104 to the second traction member 106 via the pin 108. In case of any slack in one of the roller chains 64 or in case of any misalignment between the actuator 100 and the dolly 22, a slight lateral movement of the first traction member 104, allowed by a width of the slots $104_a$ and $104_b$, takes up this slack and maintains a substantially even tension of both roller chains 64, minimizing a drive difference between the two roller chains 64. As a result, parts of the actuator 100 that are beyond the first traction member 104, from the second traction member 106 until the bumpers 118, are self-centered within the apparatus 10.

Continuing with the description of FIG. 16, links 116 are attached to actuator 100 at points beyond the second traction member 106, for example above the two rollers 114. A point of attachment of the links 116 may vary within the self-centered part of the actuator 100. Cables, ropes or chains may be used to attach the links 116 to the dolly 22, for pulling the dolly 22.

In embodiments in which a single, central rolling chain 64 is used, a single, central upright plate 98 transfers the drive centrally to the actuator 100, without a load balancing system.

Figure 20:
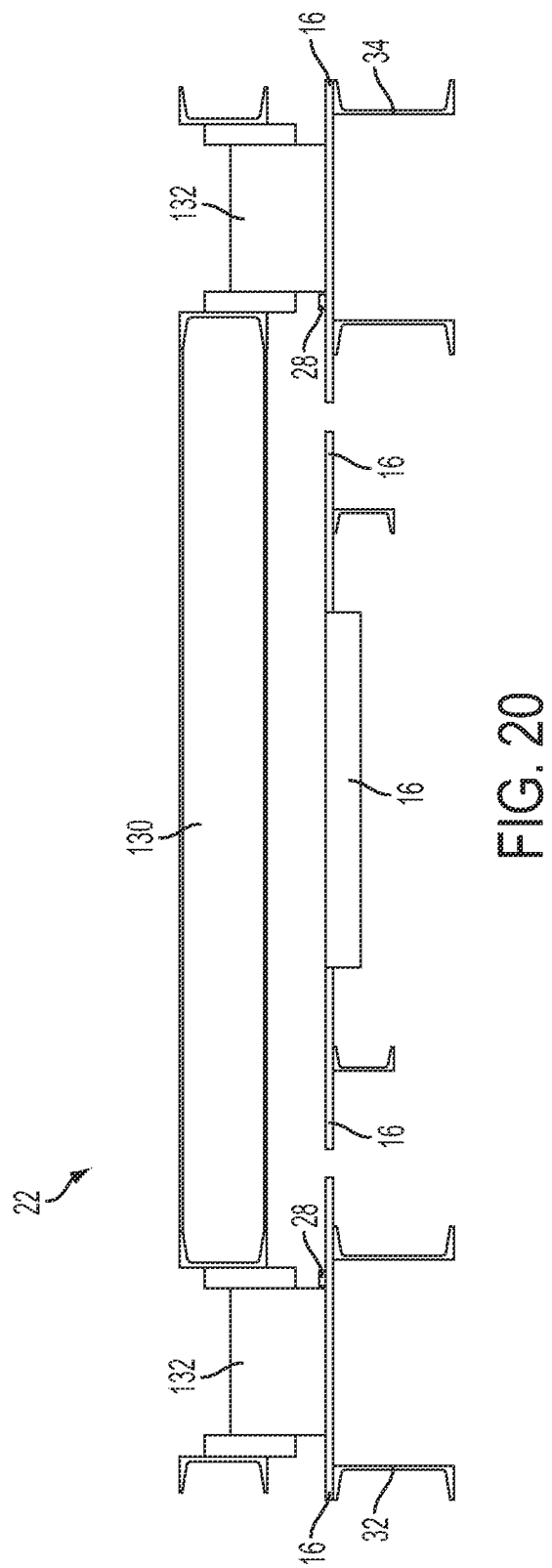
FIG. 20 is a front elevation view of a dolly mounted on the apparatus of FIG. 1.

FIG. 20 is a front elevation view of a dolly mounted on the apparatus of FIG. 1. The dolly 22 comprises at least one transversal beam, such as beam 130, on which the bumpers 118 of the apparatus 10 may push. The dolly 22 also comprises pairs of guiding wheels 132 rolling on the supporting plates 16 and guided by the rails 28. Though the rails 28 are shown on an interior side of the guiding wheels 132, rails may also be placed on an exterior side of the guiding wheels 132. Safety guards (not shown) may be added in order to prevent accidental contact with the guiding wheels 132. The above mentioned cables, ropes or chains, for attachment to the links 116 of the actuator 100, may be attached at various places of the dolly 22, near a distal extremity thereof in order to allow pulling of the dolly 22.

Figure 21:
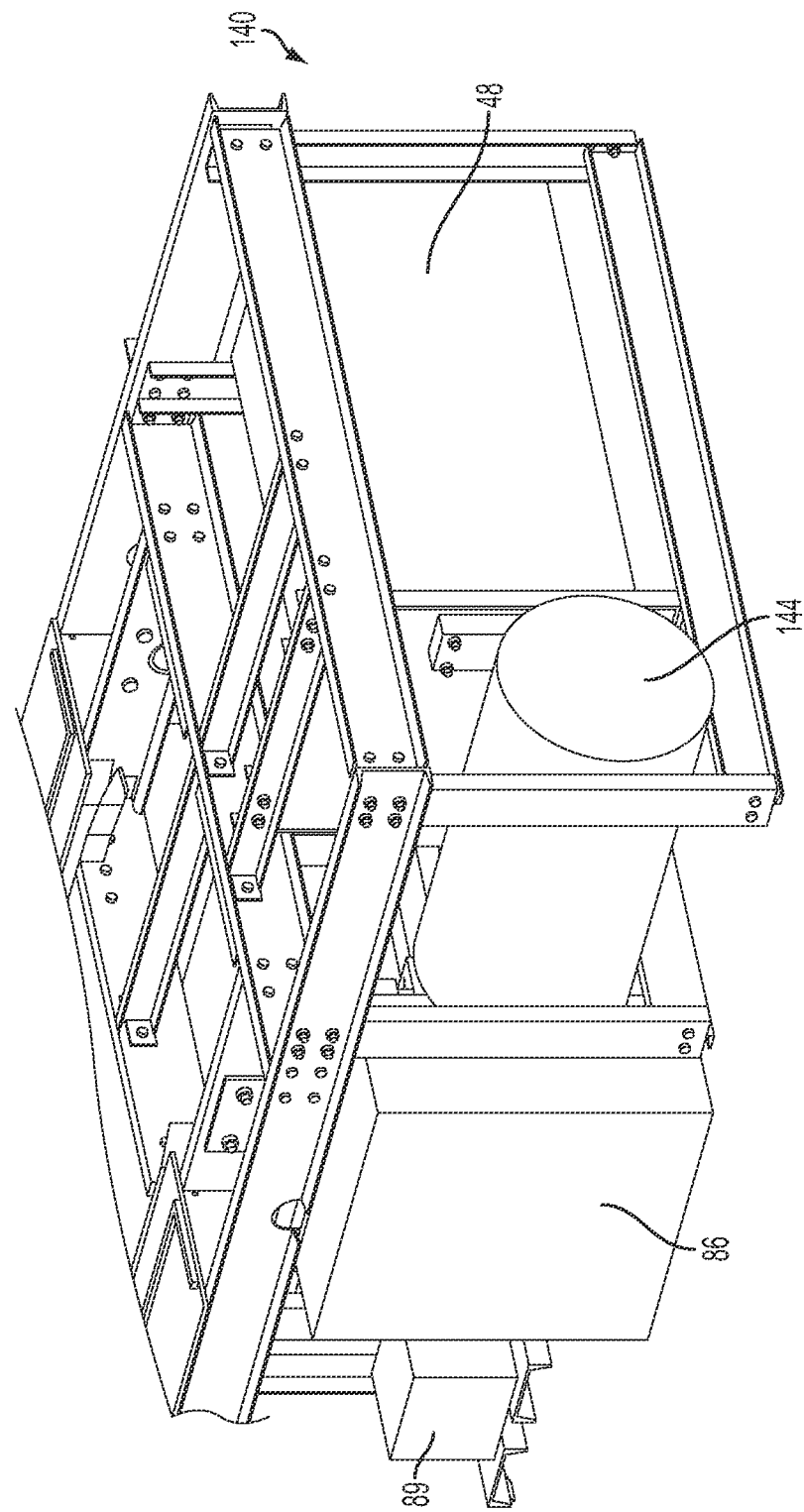
FIG. 21 is a perspective, cutaway view of a power generation assembly of the apparatus of FIG. 1.

FIG. 21 is a perspective, cutaway view of a power generation assembly of the apparatus of FIG. 1. A power generation assembly 140 may be located at a proximal end of the apparatus 10, near the motorized unit. It comprises the electric generator 48, which may be a diesel power generator, and a fuel tank 144, which may hold diesel fuel for the electric generator 48. Because the fuel tank 144 and the electric generator 48 are proximally located, no elongated fuel conduit is present and risks of spillage are minimized.

A controller 86 controls the electric motor 66. In some embodiments, the controller 86 may control other functions of the apparatus 10. Of course, other embodiments may comprise a plurality of dedicated controllers for separately controlling the electric motor 66 and other functions of the apparatus 10. Electrical power may thus be provided to the electric motor 66 from a power supply comprising the electric generator 48. Alternatively, the power supply may comprise an external power source (not shown). Because the apparatus 10 may be transported between various sites where distinct industrial voltages are available, the apparatus 10 may comprise a transformer acting 89 as a voltage converter of the external power source. The controller 86 may further comprise a selector for making a selection between the electric generator 48 and an external power source.

In operation, the controller 86 controls a movement of the dolly 22. Commands entered by an operator on the controller 86 are transferred to the motorized unit for pushing the dolly 22 in a rolling motion from the apparatus 10 onto a container or a flatbed trailer, or for pulling the dolly 22 from the container or flatbed trailer onto the apparatus 10. The controller 86 may further control a variable speed of the motorized unit, controlling its acceleration and deceleration. When the controller 86 senses that current is applied to the motor 66 while the motor 66 is not rotating, it interprets this event as an indication that the dolly 22 has reached a maximum forward point on the container or trailer, a maximum rearward point on the apparatus 10, or a potentially dangerous blockage position. The controller 86 then cuts off the electrical power applied to the electric motor 66. Because the controller 86 interprets a discrepancy between a voltage applied to the motor 66 and a lack of rotation of the motor 66 as a need to stop a movement of the motorized unit, the apparatus 10 does not require the use of mechanical limit switches for operation.

A remote control (not shown), connected via wire or wirelessly to the controller 86, may be used by an operator for entering various commands for controlling operation of the apparatus 10. Instead of or in addition to the remote control, one or more manual commands may be positioned at various locations on the base 12 for actuating an emergency brake (not specifically shown) operably connected to the electric motor 66.

Those of ordinary skill in the art will realize that the description of the apparatus are illustrative only and are not intended to be in any way limiting. Other embodiments will readily suggest themselves to such persons with ordinary skill in the art having the benefit of the present disclosure. Furthermore, the disclosed apparatus may be customized to offer valuable solutions to existing needs and problems of loading and unloading heavy freight.

In the interest of clarity, not all of the routine features of the implementations of the apparatus are shown and described. It will, of course, be appreciated that in the development of any such actual implementation of the apparatus, numerous implementation-specific decisions may need to be made in order to achieve the developer's specific goals, such as compliance with application-related and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of heavy machinery having the benefit of the present disclosure.

The controller 86 described herein may comprise software, firmware, hardware, or any combination(s) of software, firmware, or hardware suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An apparatus for moving a dolly longitudinally along a base of the apparatus, comprising:
   an actuator;
   a first mechanical drive having a first roller chain for transmitting a drive from a motorized unit to a first rotating axle mounted on the apparatus; and
   a second mechanical drive having a second roller chain and a third roller chain mounted in parallel with the second roller chain, the second and third roller chains being operably connected to the actuator for transmitting the drive from the first rotating axle to the actuator, the actuator further transmitting the drive to the dolly.

2. The apparatus of claim 1, wherein the actuator is further configured to engage the dolly in a rolling motion on top of the base.

3. The apparatus of claim 1, comprising a load balancer for minimizing a drive difference between the second and third roller chains.

4. The apparatus of claim 3, wherein the load balancer comprises:
   a first traction member operably connected to the second and third roller chains;
   a second traction member fixedly attached to the actuator; and
   a pivot for transmitting the drive from the first traction member to the second traction member.

5. The apparatus of claim 1, comprising one or more supporting plates mounted on the base for providing a surface for rollably supporting the dolly.

6. The apparatus of claim 1, comprising a controller for controlling a movement of the dolly.

7. The apparatus of claim 6, comprising a remote control operably connected to the controller.

8. The apparatus of claim 7, wherein the remote control is further capable of controlling a variable speed of the motorized unit.

9. The apparatus of claim 1, comprising an emergency brake operably connected to the motorized unit.

10. The apparatus of claim 9, comprising a manual command positioned on the base for actuating the emergency brake.

11. The apparatus of claim 1, comprising a power supply for the motorized unit.

12. The apparatus of claim 11, comprising a selector of the power supply and a combination of a generator with an external power source.

13. The apparatus of claim 11, comprising a connection of the power supply to an external power source.

14. The apparatus of claim 13, comprising a converter of a voltage of the external power source.

15. The apparatus of claim 11, comprising an electric generator.

16. The apparatus of claim 15, comprising a fuel reservoir for providing fuel to the electric generator.

17. The apparatus of claim 15, comprising a controller for controlling the electric generator.

18. An apparatus for moving a dolly longitudinally along a base of the apparatus, comprising:
   an actuator;
   a first mechanical drive for transmitting a drive from a motorized unit to a first rotating axle mounted on the apparatus;
   a second mechanical drive operably connected to the actuator for transmitting the drive from the first rotating axle to the actuator, the actuator further transmitting the drive to the dolly; and
   a bumper mounted on the actuator for pushing the dolly.

19. The apparatus of claim 18, wherein the first mechanical drive comprises a first roller chain for transmitting the drive from the motorized unit to the first rotating axle.

20. The apparatus of claim 19, wherein the second mechanical drive comprises a second roller chain operably connected to an actuator for transmitting the drive to the dolly.

21. An apparatus for moving a dolly longitudinally along a base of the apparatus, comprising:
   an actuator;
   a first mechanical drive for transmitting a drive from a motorized unit to a first rotating axle mounted on the apparatus;
   a second mechanical drive operably connected to the actuator for transmitting the drive from the first rotating axle to the actuator, the actuator further transmitting the drive to the dolly; and
   a link mounted on the actuator for attaching to the dolly and for pulling the dolly.

22. An apparatus for moving a dolly longitudinally along a base of the apparatus, comprising:
   a motorized unit;
   a first sprocket operably connected to the motorized unit;
   a first rotating axle mounted at a proximal end of the apparatus;
   a second sprocket mounted on the first rotating axle;
   a first mechanical drive having a first roller chain connecting the first and second sprockets for transmitting a drive of the motorized unit from the first sprocket to the first rotating axle;
   a third sprocket mounted on the first rotating axle;
   a second rotating axle mounted at a distal end of the apparatus;
   a fourth sprocket mounted on the second rotating axle;
   a second mechanical drive having a second roller chain; and
   an actuator;
   wherein the second roller chain connects the third and fourth sprockets and wherein the second roller chain is operably connected to the actuator for transmitting the drive from the first rotating axle to the actuator, the actuator further transmitting the drive to the dolly.

23. The apparatus of claim 22, wherein the motorized unit comprises an electric motor and a speed reducer positioned between the electric motor and the first sprocket.

24. An apparatus for moving a dolly longitudinally along a base of the apparatus, comprising:
   a first mechanical drive for transmitting a drive from a motorized unit to a first rotating axle mounted on the apparatus;
   a second mechanical drive for transmitting the drive from the first rotating axle to the dolly; and
   a plurality of electrically adjustable legs for adjusting a height of the base.

25. The apparatus of claim 24, wherein the legs are further capable of adjusting a level of the base.

* * * * *